United States Patent
Hayashi et al.

[11] Patent Number: 5,861,115
[45] Date of Patent: Jan. 19, 1999

[54] METHOD FOR FREEZE MOLDING

[75] Inventors: Shinzo Hayashi; Sadaaki Hirai, both of Nagoya, Japan

[73] Assignee: NGK Insulators, Ltd., Nagoya, Japan

[21] Appl. No.: 622,406

[22] Filed: Mar. 27, 1996

[30] Foreign Application Priority Data

Mar. 29, 1995 [JP] Japan ................................. 7-071768
Dec. 22, 1995 [JP] Japan ................................. 7-334737

[51] Int. Cl.⁶ ........................... C04B 33/28; B22F 1/00
[52] U.S. Cl. ............................... 264/28; 419/36; 419/37
[58] Field of Search ..................... 264/28; 419/36, 419/37

[56] References Cited

U.S. PATENT DOCUMENTS

| | | | |
|---|---|---|---|
| 2,765,512 | 10/1956 | Nesbit | 264/28 |
| 3,816,572 | 6/1974 | Roelofs | 264/28 |
| 4,664,857 | 5/1987 | Nambu | 264/28 |
| 4,808,353 | 2/1989 | Nambu | 264/28 |
| 4,965,027 | 10/1990 | Takahashi | 264/28 |
| 5,014,763 | 5/1991 | Frank | 164/15 |
| 5,047,181 | 9/1991 | Occhionero | 264/28 |

FOREIGN PATENT DOCUMENTS

| | | |
|---|---|---|
| E 54 859 B | 1/1991 | Austria . |
| 0 016 971 A2 | 10/1980 | European Pat. Off. . |
| 0 116 300 A2 | 8/1984 | European Pat. Off. . |
| 0 161 494 A1 | 11/1985 | European Pat. Off. . |
| 0 191 409 A1 | 8/1986 | European Pat. Off. . |
| 0 243 502 A1 | 11/1987 | European Pat. Off. . |
| 296 674 A5 | 10/1983 | German Dem. Rep. . |
| 2 361 304 | 8/1974 | Germany . |
| 35 25 752 C2 | 12/1987 | Germany . |
| 39 17 734 A1 | 12/1990 | Germany . |
| 40 37 258 A1 | 5/1991 | Germany . |
| 43 16 924 C2 | 11/1994 | Germany . |
| 47-12854 | 4/1972 | Japan . |
| 61-158403 A | 7/1986 | Japan . |
| 2-503012 A | 9/1990 | Japan . |
| 664 082 | 1/1952 | United Kingdom . |
| 2 163 780 | 3/1986 | United Kingdom . |
| 2 232 115 | 12/1990 | United Kingdom . |
| WO 88/07902 | 10/1988 | WIPO . |
| WO 93/05940 | 4/1993 | WIPO . |

OTHER PUBLICATIONS

Eisenkolb, "Fortschritte der Pulvermetallurgie", Band I Grundlagen der Pulvermetallurgie, Akademie Verlag, Berlin, 1963, S. 292–297.

*Primary Examiner*—James Derrington
*Attorney, Agent, or Firm*—Kubovcik & Kubovcik

[57] ABSTRACT

The present invention includes a method for freeze molding, comprising the steps of: mixing poly(vinyl alcohol) or a modified additive thereof with a material slurry to obtain a mixture; pouring the mixture into a molding die; and subjecting the mixture in a molding die to at least one cycle of cooling and heating so as to obtain a compact. A compact obtained in this method is free from melting and can maintain its configuration even if the compact is kept at a temperature of freezing point or higher. Further, since the method does not require vacuum drying, the compact can easily be dried.

7 Claims, 1 Drawing Sheet

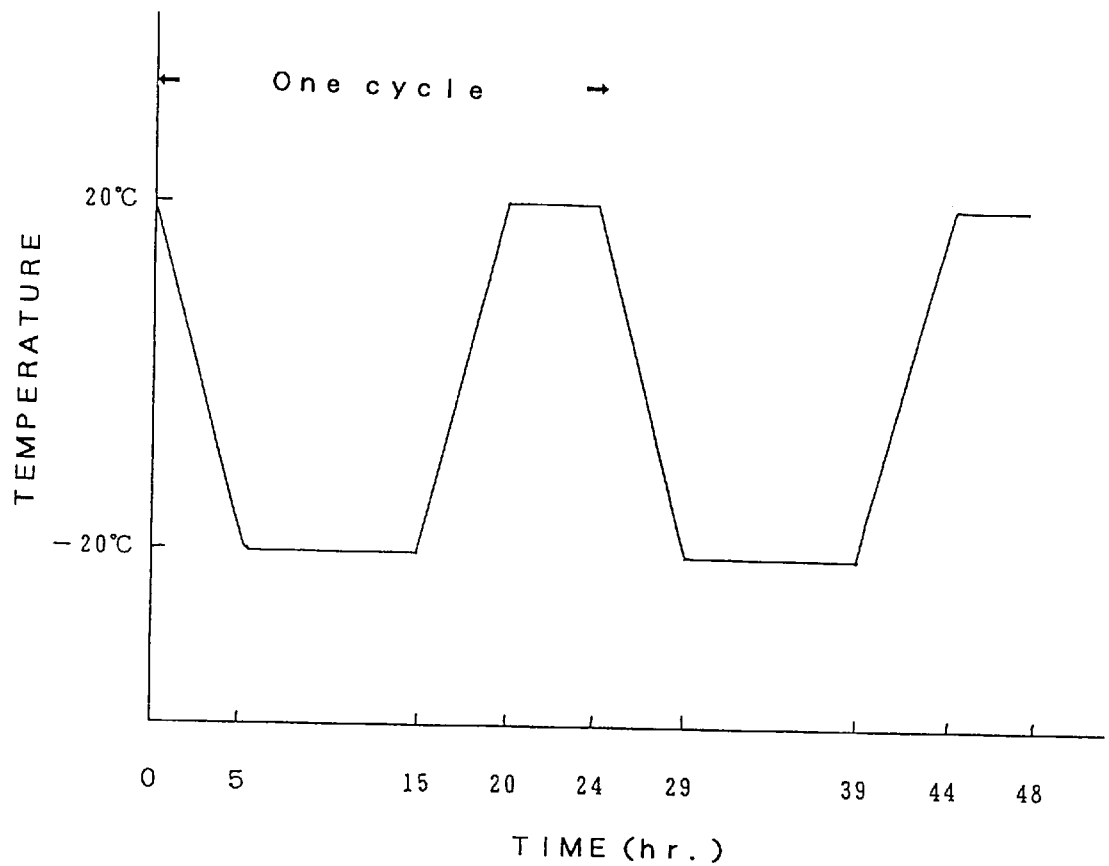
F I G. 1

METHOD FOR FREEZE MOLDING

BACKGROUND OF THE INVENTION AND RELATED ART STATEMENT

The present invention relates to a method for freeze molding for ceramic powders such as alumina, silicon carbide, and silicon nitride, and metallic powders such as Fe, Cr, and Al.

As methods for molding ceramic or metallic powder materials, there have conventionally been known various kinds of methods such as press molding, slip casting, and injection molding. Freeze molding has also been used mainly when medical and pharmaceutical products, foodstuffs, or the like are molded. In the conventional method for freeze molding, to a material such as a foodstuff are added a dispersion medium such as water and various kinds of molding aids, the material is poured into a molding die having a desired configuration, and the material is maintained in a molding die at a temperature of a freezing point or lower to freeze the material so as to obtain a compact having a desired configuration. The conventional method for freeze molding has advantages in being able to impart a complex configuration to the compact, providing a wide selection of materials for a molding die, and the like.

However, the conventional method for freeze molding has some problems. For example, a compact should be kept at or around a temperature of freezing point. Otherwise, the compact melts and the configuration of the compact cannot be maintained.

Further, when a metallic molding die, a resin molding die, or the like is used in the conventional method for freeze molding and a mixture (material slurry) of a ceramic powder and a dispersion medium is frozen, the surface of the frozen compact adheres to the inner surface of the molding die, thereby deteriorating mold releasability. Accordingly, the frozen compact is released from the molding die by force in this state, and the frozen compact is prone to deform or break.

The present invention is intended to solve the aforementioned problems and provide a method for freeze molding, which gives a compact being able to maintain a desired configuration without melting even if the compact is kept at a temperature over the freezing point, and which enhances mold releasability so as to ease a release of the frozen compact from a molding die and hardly causes a deformation or breakage of the frozen compact when the compact is released.

SUMMARY OF THE INVENTION

According to a first aspect of the present invention, there is provided a method for freeze molding, comprising the steps of: mixing poly(vinyl alcohol) or a modified additive thereof with a material slurry to produce a mixture; pouring the mixture into the molding die; and subjecting the mixture in a molding die to at least one cycle of cooling and heating.

In the present invention, the mixture is preferably subjected to cooling at a 0° C. or lower and to heating at a temperature ranging from 4° C. to 60° C. Additionally, 0.05–30 weight parts of poly(vinyl alcohol) or a modified additive thereof is preferably mixed with the 100 weight parts of a material slurry.

According to a second aspect of the present invention, there is also provided a method for freeze molding, comprising the steps of: filling a molding die with a mixture of a ceramic powder and a dispersion medium; freezing and hardening the mixture to obtain a compact; and releasing the compact from the molding die, wherein as a dispersion medium a poly(vinyl alcohol) solution is used, the mixture is frozen and hardened in the molding die to obtain a frozen compact, a temperature of the surface of the frozen compact is raised so that the surface of the frozen compact is converted into an agglutinating gel, and then the frozen compact is released from the molding die.

BRIEF DESCRIPTION OF THE DRAWINGS

FIG. 1 is a graph showing an example of a freezing and defrosting schedule according to a method of the present invention.

DETAILED DESCRIPTION OF THE INVENTION

The first aspect of the present invention is hereinbelow described in detail.

When a certain substance is added to a material slurry mainly consisting of ceramic or metallic powders, there is obtained a compact free from melting even if the compact is kept at a temperature of the freezing point or higher and the desired configuration of the compact is maintained by repeating cooling and heating treatments.

The additive used in the material slurry should be poly(vinyl alcohol) (PVA) or a modified additive thereof. The present inventors have made various investigations and found that other water-soluble polymers, for example, poly(sodium acrylate), polyethylene glycol, gelatin, and the like, each of which is used as a molding aid, do not exhibit the aforementioned property of maintaining the configuration of the obtained compact.

Modified additives (derivatives) of poly(vinyl alcohol) (PVA) includes a substance in which hydrogen or a part of hydroxyl group in a alcohol) having —(CH$_2$—CHOH)—$_n$ as a basic structure is replaced by an ester group, amino group, halogen, alkyl group, phenyl group or a substance which has a —(CH$_2$—O—CH$_2$)— type ethylene oxide linkage as a part of —(C—C)— linkage.

PVA hereinafter refers to poly(vinyl alcohol) or a modified additives thereof for convenience of explanation.

PVA to be used in the present invention preferably has a high saponification percentage. Specifically, the saponification percentage is within the range of preferably 90–100 mole %, more preferably 98 mole % or more. When the saponification percentage is low, the property of maintaining a configuration of a compact to be obtained deteriorates at a temperature of the freezing point or higher.

PVA having a larger molecular weight (higher degree of polymerization) gives a harder compact, thereby improving the property of maintaining the configuration when the article is kept at a temperature over the freezing point. On the other hand, PVA having a smaller molecular weight (lower degree of polymerization) gives a material slurry having a low viscosity, being excellent in workability. Accordingly, PVA has a degree of polymerization within the range of preferably 100–5000, more preferably 500–3000.

A small amount of PVA as an additive is sufficient. Specifically, preferably 1–20 parts by weight, more preferably 5–10 parts by weight parts of PVA is added to 100 parts by weight of a material slurry.

In the present invention, PVA is added to a material slurry, the slurry is poured into a molding die having a desired configuration, and the slurry with a molding die is subjected to at least one cycle of cooling and heating (freezing and defrosting cycle). That is, at least one cycle of subjecting the slurry together with the molding die to cooling (freezing) in the beginning and subsequently to heating (defrosting) is performed.

A material slurry containing PVA is poured into a molding die having a desired configuration. Then, the molding die is usually subjected to cooling and heating from outside. The molding die is cooled usually at 0° C. or less, preferably at −5° C. or less. After that, the molding die is heated usually to 4°–60° C., preferably at 10°–30° C. Incidentally, when the molding die is heated to a temperature over the aforementioned range, the property of maintaining the configuration of a compact cannot be maintained.

Though the cooling and heating cycle (freezing and defrosting cycle) is performed at least once, the cycle is preferably performed twice or more.

A material for this invention is not limited, and various kinds of materials such as ceramics, metals, or the like can be used. A ceramic to be used may be, for example, alumina, silicon carbide, silicon nitride, sialon, or the like. A metal to be used may be selected from various kinds of metals such as Fe, Cr, and Al, or metallic alloys.

Usually, a compact obtained in a method of the present invention is subsequently dried to remove the binder and then fired so as to obtain a desired configuration of a sintered body.

Incidentally, when the compact is kept at a higher temperature than a heating (defrosting) temperature, i.e., 70° C. or more, the compact converts into a slurry again. Accordingly, even if the obtained compact has a defect, the material can be recycled without wasting the compact.

The second aspect of the present invention is hereinbelow described in detail.

It is known that a poly(vinyl alcohol) (PVA) solution has a characteristic that when PVA solution once frozen is defrosted, it changes into an agglutinating gel. A method for freeze molding of the present invention uses this characteristic which a PVA solution possesses. Accordingly, a method of the present invention is characterized in that a PVA solution is used as a dispersion medium for a material slurry (a mixture of ceramic powders and a dispersion medium) and that a temperature of the surface of a frozen compact is raised before the frozen compact is released from a molding die.

A frozen compact obtained by freezing and hardening a material slurry containing a PVA solution does not melt the surface of the frozen compact even if a temperature of the surface is raised to a melt temperature or more, and the surface changes into an agglutinating gel. Accordingly, the frozen compact can be removed from the molding die while keeping the configuration of the frozen compact, being free from deterioration of the surface condition of the frozen compact upon releasing. Further, since a sticking condition between the surface of the frozen compact and the inner surface of the molding die by freezing is dissolved and the frozen compact can be released easily, a breakage or deformation can be avoided. A released frozen compact is cooled down to a freezing temperature or lower, thereby maintaining a good configuration and surface condition of the released compact. Subsequently, the frozen compact is subjected to later steps (drying, firing, etc.).

A ceramic powder used in the present invention is not limited, and powders, for example, alumina, silicon nitride, silicon carbide, zirconia, sialon, and the like can be used. There can also be used a powder to which various kinds of aids are added so as to improve a sintering property, etc., of a sintered body to be obtained.

PVA used to produce a material slurry in the second aspect of the invention has a saponification percentage of preferably 85 mole % or more, more preferably 95 mole % or more. If the saponification percentage is less than 85 mole %; the surface of the frozen compact melts, the compact may not maintain a desired configuration, and a surface condition deteriorates when a temperature of the surface of the frozen compact is raised.

Though a solvent for a PVA solution may be either of water type or non-water type, the solvent is limited to the one in which PVA dissolves. Accordingly, for example, methanol or ethanol cannot be used. However, a mixed solvent made of water and methanol or ethanol can be used. There can be also used a solvent to which additives such as a dispersant, a bonding agent, a defoaming agent, and a surface-active agent are added necessary.

Incidentally, when a dispersion medium different from a PVA solution is used, the surface of the frozen compact does not change into an agglutinating gel, and usually the surface melts. Therefore, the frozen compact cannot maintain the desired configuration and the surface of the frozen compact deteriorates though the release of the compact from the molding die becomes easy. In this case, a post process for amending a configuration or a surface condition of the released compact is required.

A percentage of ceramic powder in a mixture is preferably 60% or less by volume. An amount of PVA in the material slurry is preferably 0.05 - 20 wt %, more preferably 1–5 wt %.

As a means to raise a surface temperature of a frozen compact after freezing and hardening a material slurry, the molding die may be heated. Alternatively, after the material slurry is frozen and hardened to obtain a frozen compact in a molding die, the compact may be left in the ambient air until the surface of the frozen compact changes into a gel. A thickness of the agglutinating gel which forms a surface portion of the compact is preferably as thin as possible, and preferably at most about 2 mm. If the compact gelates from the surface up to a deep portion of the compact, the compact is prone to be deformed.

Incidentally, a released frozen compact must to be dried before being subjected to firing. Generally, a released frozen compact is maintained under vacuum for drying, and a dispersant medium is sublimated. This method is called a freeze- drying method. Therefore, a released frozen compact the surface of which is changed into a gel is cooled at a temperature of a freezing point or lower so as to freeze again while keeping the inherent configuration. Then the compact is subjected to freeze-drying. When another drying method, for example, humidity drying, and air drying, is employed, the compact before being dried does not require being frozen again. However, the compact is preferably frozen again before being dried in consideration of homogeneity, and the like, of the compact after being dried.

The frozen compact obtained by the method for freeze molding of the present invention is dried by the aforementioned freeze-drying, or the like, followed by being subjected to firing generally employed for ceramics so as to obtain a sintered body. The compact obtained in the present invention has little deformation caused by releasing and has surface condition because the compact is not released by force, and a finally obtained ceramic sintered body has an excellent precision in configuration and excellent surface condition.

The present invention is hereinbelow described in more detail with reference to the Examples. However, the present invention is by no means limited to the Examples.

EXAMPLE 1

There was produced a ceramic slurry having a composition shown below. The slurry had a viscosity of 5 poise.

| | |
|---|---|
| Silicon nitride | 45 wt % |
| Water | 55 wt % |
| Dispersant<br>(ammonium polycarboxylate) | 1 wt % (external distribution) |
| Poly(vinyl alcohol)<br>(C-25GP produced by Shin-Etsu Chemical Co., Ltd.) | 5 wt % (external distribution) |

Then, the obtained slurry was poured into a beaker having a capacity of 300 ml. The beaker was put in an apparatus which temperature is controllable and subjected to freezing and defrosting. A freezing and defrosting schedule is shown in Table 1.

Compacts were obtained after 1, 2, 5 or 10 cycles of freezing and defrosting. Samples each having dimensions of 20×20×20 mm were cut out of the compacts and kept at room temperature so as to be measured for hardness. The results are shown in Table 1.

Incidentally, there is used an material testing machine produced by SHIMADZU CORPORATION for the measurement of hardness (elastic coefficient). The values were obtained from an inclination of a load-displacement curve obtained by subjecting the compacts to a compressive test with a cross head speed of 1 mm/min.

TABLE 1

| Number of freezing and defrosting cycle | 0 | 1 | 2 | 5 | 10 |
|---|---|---|---|---|---|
| Hardness (kgf/m$^2$) | slurry | 0.07 | 0.1 | 0.14 | 0.14 |

The results indicate that a compact obtained by subjecting a slurry containing a small amount of PVA in a molding die to freezing and defrosting repeatedly can maintain its configuration even if the compact is kept at room temperature which is higher than a freezing point.

EXAMPLE 2

To water were added PVA having a saponification percentage of 99 mole % and a dispersant (ammonium polycarboxylate) so as to obtain a dispersion medium. With the dispersion medium was mixed silicon nitride powder as a ceramic powder to obtain a mixture. The mixture was subjected to vacuum deairing under −70 cmHg for three minutes so as to obtain a material slurry containing a silicon nitride powder having a volume concentration of 35 volume % and 2 wt % of PVA. A square plate having a dimension of 50×50×15 mm was produced by a method for freeze molding. As the method, a molding die made of an aluminum alloy and having a molding portion of predetermined dimension (separate type) was filled with a material slurry under a pressure of 0.5 kg/cm$^2$, and the molding die was cooled at about −70° C. so as to freeze the material slurry.

Subsequently, the molding die was left in the ambient air until a temperature of the molding die reached 5° C. so as to raise a surface temperature of the frozen compact in the molding die up to a melting point or higher. Then, the frozen compact was released easily by decomposing the molding die. Since the surface of the frozen compact did not melt and gelated though the surface temperature of the frozen compact was at a freezing point or higher upon being released, the configuration of the frozen compact was maintained and the surface condition of the compact was excellent.

After releasing the frozen compact, the compact was frozen again while keeping the same configuration, and then subjected to freeze-drying under a pressure of about 0.1 Torr at −20° C. for 40 hours. The dried compact was measured for surface flatness. As shown in Table 2, the flatness was 0.11 mm. The small value proved that the compact could be released and dried while sufficiently maintaining the configuration obtained from the inner surface of the molding die.

COMPARATIVE EXAMPLE 1

Freeze molding was performed in the same manner as in Example 2 except that PVA was not added to a dispersant medium. The molding die made of aluminum alloy was left in the ambient air until a temperature of the molding die became 5° C. so as to raise the surface temperature of the frozen compact to a melt point or higher. Then the frozen compact was released. The surface of the frozen compact melted, and the surface condition was aggravated. The obtained frozen compact was frozen again while maintaining the condition of the frozen compact. Then, the frozen compact was subjected to freeze-drying in the same manner as in Example 2. The dried compact was measured for surface flatness, and the value was 0.92 mm. The large value proved that the configuration obtained from the inner surface of the molding die was not maintained at all.

COMPARATIVE EXAMPLE 2

Freeze molding was performed in the same manner as in Example 2 except that PVA having a saponification percentage of 75 mole % was added to a dispersion medium. The molding die made of aluminum alloy was left in the ambient air until a temperature of the molding die became 5° C. so as to raise the surface temperature of the frozen compact to a melting point or higher. Then the frozen compact was released. The surface of the frozen compact melted, and the surface condition was aggravated. The obtained frozen compact was frozen again with maintaining the condition of the frozen compact. Then, the frozen compact was subjected to freeze-drying in the same manner as in Example 2. The dried compact was measured for surface flatness, and the value was 0.84 mm. The large value proved that the inherent configuration obtained from the inner surface of the molding die was not maintained at all.

TABLE 2

| | Saponification percentage of PVA (mole %) | PVA amount in material slurry (wt %) | Surface condition of frozen compact | Surface flatness of dried compact (mm) |
|---|---|---|---|---|
| Example 2 | 99 | 2 | good | 0.11 |
| Comp. Ex. 1 | — | — | bad | 0.92 |
| Comp. Ex. 2 | 75 | 2 | bad | 0.84 |

As described above, according to the first aspect of the present invention, a compact does not melt and can maintain its configuration even if the compact is kept at a freezing temperature or higher, for example, at room temperature unlike a compact produced by a conventional freeze molding. Further, since the method of the present invention does not require vacuum drying unlike a conventional freeze molding, drying becomes easy.

The method of the first aspect of the invention is economical because a large apparatus which is used in an injection molding or the like is not required. In the method of the first aspect of the invention, a binder (PVA) can be easily removed because the molding requires only a small amount of PVA.

Furthermore, a compact obtained by the method of the first aspect of the invention becomes a slurry again by being kept at a temperature higher than the aforementioned heating (defrosting) temperature, thereby being recyclable.

According to the second aspect of the present invention, an adhesion of the surface of the frozen compact and the inner surface of the molding die is dissolved, and the frozen compact can be released easily without forcing. Therefore, breakage and deformation of the frozen compact can be avoided. Because a PVA solution is used as a dispersion medium of a material slurry, the surface of the frozen compact does not melt and converts into an agglutinating gel. Therefore, the frozen compact can be released from the molding die while maintaining the configuration, and the surface of the frozen compact is not aggravated. Thus, a frozen compact obtained by a method of the second aspect of the present invention is excellent in configuration precision and a surface condition. Therefore, the frozen compact does not require post breakage (machining a compact or a sintered body) for amending a surface condition or a configuration, thereby decreasing the number of steps and production cost.

What is claimed is:

1. A method for freeze molding, comprising the steps of:
   mixing poly(vinyl alcohol) or a modified additive thereof with a slurry of a ceramic or metal powder to obtain a mixture;
   pouring the mixture into a molding die;
   subjecting the mixture in the molding die to at least one cycle of freezing and defrosting so as to obtain a compact;
   drying the compact to remove the poly(vinyl alcohol) or modified additive thereof; and then
   firing the dried compact to obtain a sintered body.

2. A method for freeze molding according to claim 1, wherein the mixture is subjected to cooling at 0° C. or lower and to heating at a temperature within the range from 4° C. to 60° C.

3. A method for freeze molding according to claim 1, wherein 0.05–30 weight parts of poly(vinyl alcohol) or the modified additive thereof is mixed with the 100 weight parts of a material slurry.

4. A method for freeze molding according to claim 1, wherein the poly(vinyl alcohol) has a saponification percentage of 90 mole % or more.

5. A method for freeze molding, comprising the steps of:
   filling a molding die with a mixture of a ceramic powder and a dispersion medium;
   freezing and hardening the mixture to obtain a compact;
   releasing the compact from the molding die;
   drying the compact to remove the poly(vinyl alcohol) or modified additive thereof; and then
   firing the dried compact to obtain a sintered body;
   wherein as a dispersion medium a poly(vinyl alcohol) solution is used, the mixture is frozen and hardened in the molding die to obtain a frozen compact, a temperature of the surface of the frozen compact is raised so that the surface of the frozen compact is converted into an agglutinating gel, and then the frozen compact is released from the molding die.

6. A method for freeze molding, according to claim 5, wherein the frozen compact released from the molding die is frozen again in the state that the configuration of the compact is maintained.

7. A method for freeze molding according to claim 5, wherein the poly(vinyl alcohol) solution is made by using a poly(vinyl alcohol) having a saponification percentage of 85 mole % or more.

* * * * *